Patented Aug. 4, 1953

2,647,924

UNITED STATES PATENT OFFICE 2,647,924

3-HYDROXYPHENYL QUATERNARY AMMONIUM COMPOUNDS

John Alfred Aeschlimann, Montclair, N. J., and Arthur Stempel, Brooklyn, N. Y., assignors to Hoffmann-La Roche Inc., Nutley, N. J., a corporation of New Jersey No Drawing. Application March 30, 1950, Serial No. 152,998

5 Claims. (Cl. 260—501)

This invention relates to (3-hydroxyphenyl)-ethyl dimethylammonium and (3-hydroxyphenyl) diethyl methylammonium compounds, and more particularly to compounds which can be represented by the following formula:

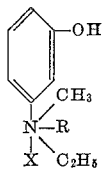

wherein R represents methyl or ethyl and X represents an anion, for example, chlorine, bromine, iodine, p-toluenesulfonyloxy (p—CH$_3$C$_6$H$_4$SO$_3$—)

methyl sulfate (CH$_3$SO$_4$—), ethyl sulfate (C$_2$H$_5$SO$_4$)

and the like. The new compounds are useful for their anti-curare activity.

The compounds of the above formula where R is methyl can in general be prepared by quaternizing m-dimethylaminophenol with a quaternizing compound which introduces an ethyl group and an anion, such as, an ethyl halide, diethyl sulfate, or ethyl p-toluenesulfonate; and where R is ethyl by quaternizing m-diethylaminophenol with a quaternizing compound which introduces a methyl group and an anion, such as, a methyl halide, dimethyl sulfate, or methyl p-toluenesulfonate. The compounds of the above formula where X is a halogen, for example, chlorine, bromine or iodine are particularly valuable since they are readily obtained in the crystalline form.

The following examples will serve to illustrate the invention.

EXAMPLE 1

(3 - hydroxyphenyl) ethyl dimethylammonium bromide

To a solution of 100 grams of m-dimethylaminophenol in 1100 cc. of acetone there were added 150 grams of ethyl bromide. The solution was heated in a nitrogen atmosphere in a closed vessel for ten hours at 80° C. An oily product that soon crystallized separated. It was filtered off and recrystallized from a mixture of ethanol and ether, yielding (3-hydroxyphenyl)-ethyl dimethylammonium bromide; M. P. 151–152° C. (with decomposition).

EXAMPLE 2

(3 - hydroxyphenyl) ethyl dimethylammonium iodide

A solution made up of 10 grams of m-dimethylaminophenol, 50 cc. of acetone and 13 grams of ethyl iodide was heated at 50° C. for five hours. On addition of ether to the cooled solution, (3-hydroxyphenyl) ethyl dimethylammonium iodide precipitated as an oil which soon crystallized. Upon recrystallization from isopropanol the compound had a M. P. of 113–115° C.

EXAMPLE 3

(3 - hydroxyphenyl) ethyl dimethylammonium chloride

A slight excess of a 10% sodium hydroxide solution was added to a solution of 23 grams of silver nitrate in 300 cc. of water. The precipitated silver oxide was washed free of silver ion with distilled water. To a suspension of the silver oxide in 200 cc. of water, a solution of 25 grams of (3-hydroxyphenyl) ethyl dimethylammonium iodide in 300 cc. of water was added. The precipitate of silver iodide was removed by filtration and the filtrate concentrated to a volume of about 100 cc. in vacuo. The remainder of the water was removed by lyophilization. (3-hydroxyphenyl) ethyl dimethylammonium hydroxide was obtained as a hygroscopic, amorphous solid. A solution of 5 grams of (3-hydroxyphenyl) ethyl dimethylammonium hydroxide in about 200 cc. of water was neutralized with dilute hydrochloric acid. On concentration to dryness in vacuo, (3-hydroxyphenyl) ethyl dimethylammonium chloride crystallized. The compound was recrystallized from isopropanol; M. P. 162–163° C. (with decomposition).

EXAMPLE 4

(3 - hydroxyphenyl) ethyl dimethylammonium p-toluenesulfonate

A solution of 15 grams of m-dimethylaminophenol in 150 cc. of acetone was heated with 25 grams of ethyl p-toluenesulfonate at 80° C. for 24 hours in a closed vessel. The (3-hydroxyphenyl) ethyl dimethylammonium p-toluenesulfonate precipitated as a viscous oil on addition of ether to the acetone solution. It was dissolved in water and extracted thoroughly with ether. On removal of water by evaporation in vacuo, the compound was obtained as a hygroscopic viscous material. By employing diethyl sulfate instead of ethyl p-toluenesufonate, the corresponding (3 - hydroxyphenyl) ethyl dimethylammonium ethyl sulfate may be obtained.

EXAMPLE 5

*(3 - hydroxyphenyl) diethyl methylammonium bromide*

A solution made up of 10 grams of m-diethylaminophenol, 50 cc. of acetone, and 13 grams of methyl bromide was heated at 70° C. for 4 hours in a closed vessel. An oily product separated which crystallized on standing. It was recrystallized from isopropanol, yielding (3-hydroxyphenyl) diethyl methylammonium bromide; M. P. 167–169° C. (with decomposition).

EXAMPLE 6

*(3 - hydroxyphenyl) diethyl methylammonium p-toluenesulfonate*

A solution made up of 15 grams of m-diethylaminophenol, 150 cc. of acetone and 17 grams of methyl p-toluenesulfonate was heated in a closed vessel in a nitrogen atmosphere at 80° C. for 15 hours. The acetone was removed by distillation in vacuo, the residue was dissolved in 250 cc. of water, and the solution extracted with ether to remove any unreacted reagents. On concentration of the aqueous phase to dryness in vacuo, (3-hydroxyphenyl) diethyl methylammonium p-toluenesulfonate was obtained as a highly viscous oil. By employing dimethyl sulfate instead of methyl p-toluenesulfonate, the corresponding (3 - hydroxyphenyl) diethyl methylammonium methyl sulfate may be obtained.

We claim:

1. (3-hydroxyphenyl) ethyl dimethylammonium bromide.
2. (3-hydroxyphenyl) ethyl dimethylammonium iodide.
3. (3-hydroxyphenyl) ethyl dimethylammonium chloride.
4. (3-hydroxyphenyl) ethyl dimethylammonium p-toluenesulfonate.
5. A compound selected from the group consisting of (3-hydroxyphenyl) ethyl dimethylammonium bromide, (3-hydroxyphenyl) ethyl dimethylammonium iodide, (3-hydroxyphenyl)-ethyl dimethylammonium chloride, and (3-hydroxyphenyl) ethyl dimethylammonium p-toluenesulfonate.

JOHN ALFRED AESCHLIMANN.
ARTHUR STEMPEL.

References Cited in the file of this patent

UNITED STATES PATENTS

| Number | Name | Date |
|---|---|---|
| 2,208,485 | Aeschlimann | July 16, 1940 |

OTHER REFERENCES

Haworth et al., "Journal Chem. Soc. (London), 1947, pp. 182 to 191.

Chemical Abstracts, vol. 41 (1947), page 4576.